United States Patent
Hodsdon et al.

(10) Patent No.: US 10,436,236 B2
(45) Date of Patent: Oct. 8, 2019

(54) THREADED FASTENING

(71) Applicant: Velcro BVBA, Deinze (BE)

(72) Inventors: Jerry G. Hodsdon, Manchester, NH (US); Christopher C. Libby, Hooksett, NH (US); James R. Barker, Francestown, NH (US)

(73) Assignee: Velcro BVBA, Deinze (BE)

( * ) Notice: Subject to any disclaimer, the term of this patent is extended or adjusted under 35 U.S.C. 154(b) by 113 days.

(21) Appl. No.: 15/728,630

(22) Filed: Oct. 10, 2017

(65) Prior Publication Data

US 2019/0107139 A1    Apr. 11, 2019

(51) Int. Cl.
| | |
|---|---|
| *F16B 35/02* | (2006.01) |
| *F16B 31/04* | (2006.01) |
| *F16B 31/02* | (2006.01) |
| *F16B 5/02* | (2006.01) |
| *F16B 31/00* | (2006.01) |
| *F16K 17/04* | (2006.01) |
| *F16K 17/06* | (2006.01) |

(52) U.S. Cl.
CPC .......... *F16B 31/043* (2013.01); *F16B 5/0241* (2013.01); *F16B 5/0266* (2013.01); *F16B 5/0283* (2013.01); *F16B 31/00* (2013.01); *F16B 31/02* (2013.01); *F16K 17/046* (2013.01); *F16K 17/06* (2013.01)

(58) Field of Classification Search
CPC .... F16B 5/0241; F16B 5/0266; F16B 5/0283; F16B 31/02; F16K 17/046
USPC .......................... 411/383, 384, 395, 397, 178
See application file for complete search history.

(56) References Cited

U.S. PATENT DOCUMENTS

| | | | | |
|---|---|---|---|---|
| 3,189,075 A | * | 6/1965 | Jobe ...................... | F16B 35/041 411/272 |
| 3,390,712 A | * | 7/1968 | McKay ................... | F16B 39/04 24/453 |
| 5,624,221 A | * | 4/1997 | Poe ........................ | B64D 29/00 411/383 |

(Continued)

FOREIGN PATENT DOCUMENTS

| | | |
|---|---|---|
| EP | 1862740 | 12/2007 |
| EP | 1945406 | 7/2008 |

(Continued)

OTHER PUBLICATIONS

PCT International Search Report in International Application No. PCT/EP2018/077240, dated Dec. 20, 2018, 13 pages.

*Primary Examiner* — Gary W Estremsky
(74) *Attorney, Agent, or Firm* — Fish & Richardson P.C.

(57) ABSTRACT

A fastener assembly includes a stud, a threaded sleeve, and a compression spring. The stud includes a shaft with a first head at one end and a second head at an opposite end of the shaft, both heads with opposing bearing surfaces. The threaded sleeve is disposed about the shaft. The threaded sleeve includes external threads and a tubular interior with an inwardly projected shoulder. The compression spring is disposed about the shaft inside the threaded sleeve, with a first end bearing against a shoulder of the threaded sleeve and a second end bearing against a bearing surface of the second head. The spring urges the sleeve against the bearing surface of the first head. The assembly can maintain a preload between two components while allowing the components to be separated, and can also be used as a pressure limiter.

24 Claims, 13 Drawing Sheets

(56) References Cited

U.S. PATENT DOCUMENTS

| | | | | |
|---|---|---|---|---|
| 6,234,735 B1* | 5/2001 | Ganter | ............... | F16B 5/0233 |
| | | | | 411/353 |
| 6,296,431 B1* | 10/2001 | Miller | ............... | F16B 5/0208 |
| | | | | 411/107 |
| 7,255,020 B2* | 8/2007 | Thomeczek | ............ | B25G 3/04 |
| | | | | 74/527 |
| 7,342,796 B2 | 3/2008 | Aukzemas | | |
| 8,342,787 B2* | 1/2013 | Smith | ............... | F16B 35/041 |
| | | | | 411/354 |
| 8,646,843 B2 | 2/2014 | Koch | | |
| 8,920,063 B1* | 12/2014 | Easley | ............... | F16B 21/165 |
| | | | | 269/48.1 |
| 9,010,027 B2 | 4/2015 | Cooper et al. | | |
| 9,952,129 B2* | 4/2018 | Kondo | ............... | H01H 35/006 |
| 2004/0237749 A1 | 12/2004 | Green | | |
| 2008/0042373 A1 | 2/2008 | Wilson et al. | | |
| 2014/0366453 A1 | 12/2014 | Cooper et al. | | |
| 2016/0201703 A1 | 7/2016 | Schwarzbich | | |

FOREIGN PATENT DOCUMENTS

| | | |
|---|---|---|
| EP | 2709211 | 3/2014 |
| GB | 755552 | 8/1956 |
| WO | 9641960 | 12/1996 |
| WO | 2016137339 | 9/2016 |

* cited by examiner

THREADED FASTENING

TECHNICAL FIELD

This invention relates to threaded fasteners and methods for using such fasteners.

BACKGROUND

Threaded fasteners, such as screws and the like, are found everywhere connecting two things together. Often such fasteners are employed where the connection is to be releasable. Such fasteners commonly have a head that can be turned by a mating tool, to loosen or tighten the fastener. It is desirable to preload such fasteners by tightening them to a given torque, to help prevent loosening. Once tightened, the fastener will hold the connected pieces together and prevent relative motion. While threaded fasteners have been around for a long time, improvements in their design for specific applications are still sought.

SUMMARY

One aspect of the invention features a fastener assembly including a stud, a threaded sleeve, and a spring. The stud has an elongated shaft with a first head at one end of the shaft and a second head at an opposite end of the shaft, with a bearing surface of the first head opposing a bearing surface of the second head. The threaded sleeve is disposed about the elongated shaft of the stud. The sleeve has an exterior surface adapted to connect to a threaded hole, and an interior surface with an inwardly projected shoulder. The spring is disposed about the shaft of the stud and at least partially inside the sleeve. The spring has a first end bearing against the shoulder of the threaded sleeve and a second end bearing against the bearing surface of the second head of the stud. The spring is arranged to press the sleeve against the bearing surface of the first head, such that moving the sleeve away from the first head of the stud causes the spring to compress.

In some embodiments, at least one of the first and second heads is adapted to interface with a mating tool to impart torque on the fastener assembly. In some cases, the sleeve is adapted to interface with a mating tool to impart torque on the fastener assembly. In some cases, the spring includes a compression spring.

In some examples, one of the first and second heads includes at least one rib projected from a periphery of the head. In some cases, the threaded sleeve includes at least one slot configured to receive the rib, for rotationally locking the threaded sleeve. In some examples, the fastener assembly further includes a depth stopper for preventing the sleeve from moving away from the first head of the stud when applying torque to the fastener assembly when the sleeve is inside a threaded hole.

In some arrangements, both the first and second heads are permanently secured to the shaft. In some embodiments, the second head extends from a projection that is pressed-fit into a hole of the shaft.

In some examples, the shaft is permanently connected to the first head and the second head is adjustably coupled to the shaft, for adjusting a preload of the spring. In some examples, the bearing surface of the second head is spaced apart from a tip surface of the shaft, in which the preload of the spring is decreased. In some cases, the second head is threadedly coupled to the shaft. In some cases, the second head is fully threaded in to the shaft.

In some embodiments, the second head has at least one rib projected from a periphery of the head. In some examples, the threaded sleeve has at least one slot configured to receive the rib of the second head, for rotationally locking the threaded sleeve.

In some examples, the threaded sleeve has short slots at one end facing away from the first head, the slots adapted to interface with a mating tool to impart torque on the threaded sleeve, for adjusting a preload of the spring.

In some cases, a perimeter of the first head is chamfered inwardly toward the shaft. In some embodiments, the stud includes a neck projecting from the bearing surface of the first head. In some embodiments, the bearing surface of the first head includes a sealing O-ring.

In some examples, the fastener assembly holds two pieces together, with the sleeve threaded into a first piece and a second piece fastened between the first piece and the first head.

Another aspect of the present invention features a method of releasably connecting two components. The method includes threading the fastener assembly into a threaded hole defined in a first of the two components. The method further includes compressing a second of the two components between the first component and an underside of the first head of the stud of the fastener assembly, thereby distending the fastener assembly and compressing the fastener assembly spring to maintain a preload tension in the stud shaft of the fastener assembly.

In some embodiments, the second component is compressed as the fastener assembly is threaded into the hole.

In some examples, the fastener assembly is first threaded into the hole, and then the second component is slid under the first head of the fastener assembly.

In some examples, the second component defines a slot that receives fastener assembly.

In some examples, the threaded hole is a through hole, where threading the fastener assembly includes engaging a distal end of the sleeve of the fastener assembly with a tool from a side of the first component opposite the first head of the fastener assembly.

In some examples, compressing the second component includes rotating the stud of the fastener assembly through a predetermined rotation angle to develop the desired preload. In some cases, the first head of the fastener assembly has a visible mark indicating the predetermined rotation angle. In some embodiments, the method further includes, after threading the fastener assembly and before compressing the second component, marking a surface of the second component with a surface mark aligned with a first feature of the fastener assembly, where compressing the second component includes rotating the first head of the fastener assembly to align the surface mark with the mark indicating the predetermined rotation angle.

Another aspect of the present invention features a method of limiting pressure in a volume. The method includes threading the fastener assembly into a threaded hole defined through a wall at least partially enclosing the volume, such that the threaded fastener assembly seals the threaded hole. The method further includes leaving an entrance to an exit flow path associated with the fastener assembly exposed to the volume, such that the volume pressure works against the spring to cause the first head of the stud to move away from the sleeve to open the exit flow path from the entrance to an environment about the first head of the fastener assembly in response to the volume pressure exceeding a predetermined limit.

In some cases, the exit flow path is defined at least partially through the fastener assembly. In some examples the exit flow path is blocked by an underside of the first head of the fastener assembly until the spring is compressed to open the exit flow path.

The limited pressure may be a liquid pressure or a gas pressure. Upon lowering of the volume pressure to below a cracking pressure of the threaded fastener, the exit flow path automatically closes.

Various embodiments of the invention can be particularly useful for fastening things together where at least some of the fasteners in the final assembly cannot be readily accessed by tool, or where an adjustable preload is desired so as to not harm delicate components, or where a visual preload indication is helpful. Aspects of the invention can also be employed for purposes other than for fastening components together. For example, the assembly can be configured for use as a pressure limiting or pressure relief valve.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers in different figures represent similar elements.

DETAILED DESCRIPTION

Typically, a conventional screw is tensioned (preloaded) by the application of a torque to the screw head and, in the case of a bolt, by applying torque to the bolt head or the nut. The applied torque causes the screw to 'climb' a thread causing a tensioning of the screw and an equivalent compression in the components being fastened by the screw. The preload developed in the screw is due to the applied torque and is a function of the screw diameter, the geometry of the threads, and the coefficients of friction that exist in the threads and under the torqued screw head. A fastener assembly 10 discussed in this description creates a preload when torque is applied. However, in the present disclosure, the forces are distributed along the components of fastener assembly 10, providing many advantages and making it useful for many applications.

Figure 1A:
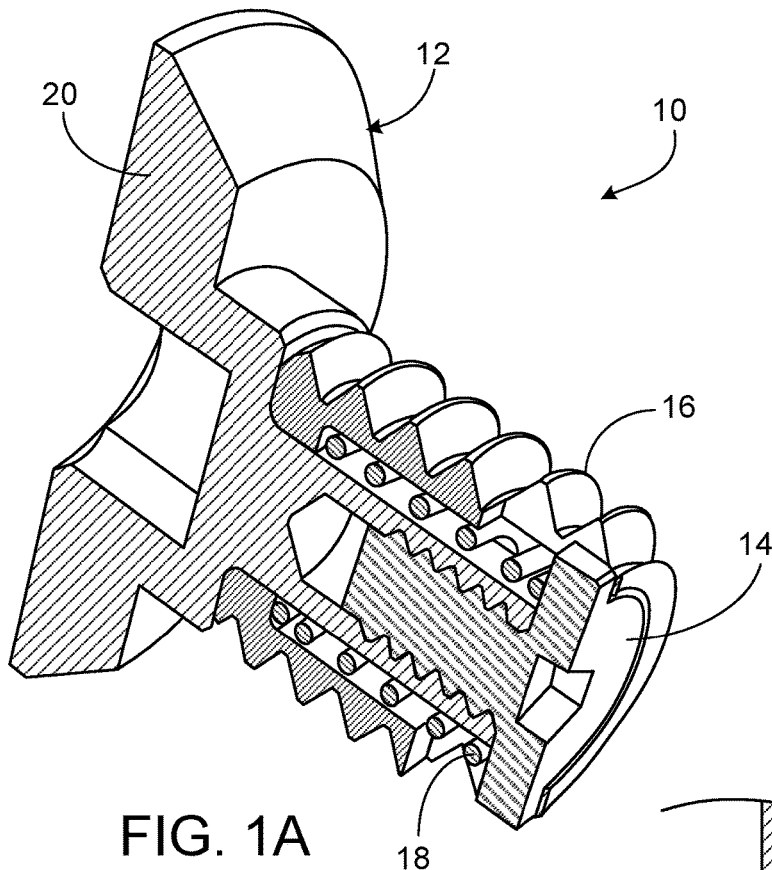
FIG. 1A is a perspective, cross-sectional view of a threaded fastener.
Figure 1B:
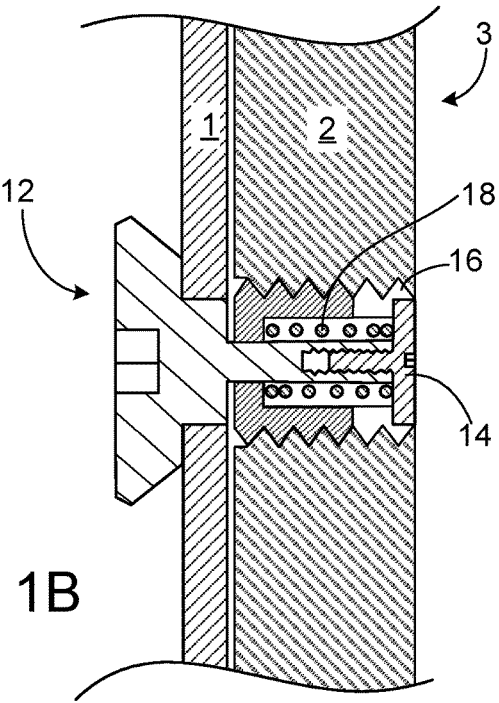
FIG. 1B is a cross-sectional side view of the threaded fastener holding an assembly together.

Referring to FIGS. 1A and 1B, fastener assembly 10 includes a headed stud 12, a bolt 14, a threaded sleeve 16, and a compression spring 18. Fastener assembly 10 (sometimes referred to herein as a threaded fastener) is configured to be used as a regular fastener as well as a fastener for special purposes, such as being one of multiple fasteners holding an assembly 3 in place, where threaded fastener 10 cannot readily be accessed in the final assembly. This is particularly advantageous when two sheets fastened together need to be separated but removing some fasteners is difficult. For example, as shown in FIG. 1B, threaded fastener 10 fastens a first sheet 1 to a second sheet 2, forming fastened assembly 3, such that threaded fastener 10 allows sheet 1 to be temporarily pulled away from sheet 2. Thus, as explained in detail below, because threaded sleeve can move with respect to stud 12, parallel sheets 1 and 2 can be moved to form a gap between them without completely disassembling assembly 3 and without unscrewing fastener 10.

Figure 2A:
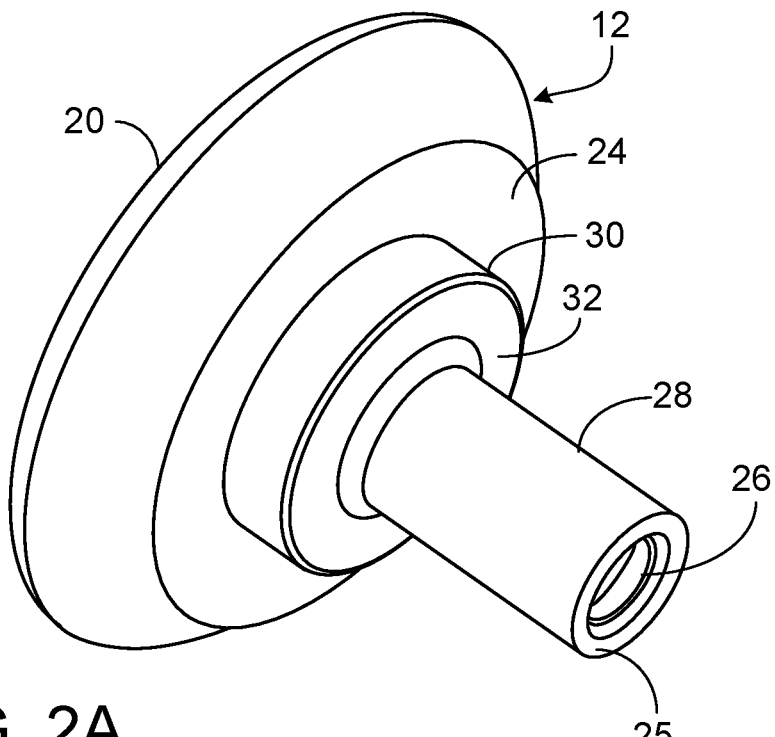
FIG. 2A is a perspective view of a headed stud.
Figure 2B:
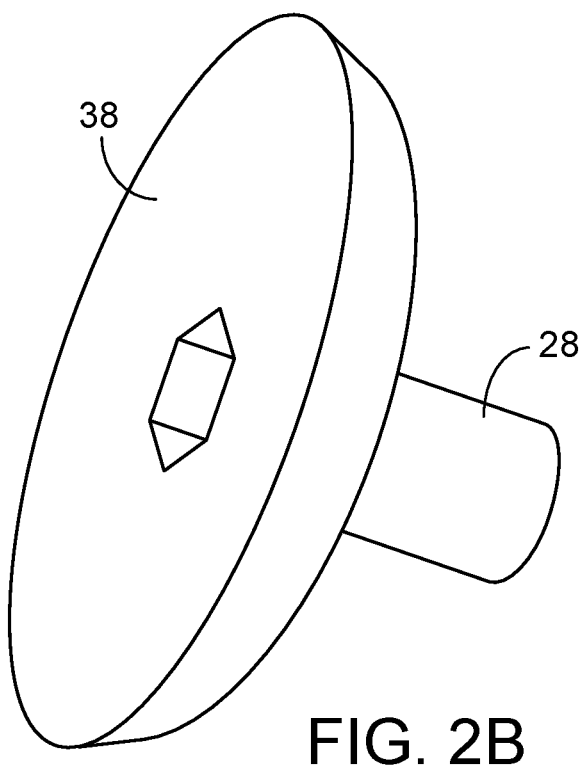
FIG. 2B is a perspective view of the back end of the headed stud.

Referring to FIGS. 2A and 2B, headed stud 12 includes a head 20, a neck 30, and a shank 28. Stud head 20 features an interface surface 38 (e.g., a hexagonal socket interface) adapted to interface with a mating tool to impart torque on fastener assembly 10 (such as an Allen hex wrench). Head 20 can alternately be configured with other interface configurations for imparting torque to threaded fastener 10, such as a full bearing surface, a flat head, a Philips head, or a square socket head.

Head 20 includes a flat surface 24 configured to bear against a surface of a fastened assembly, such as against a surface of sheet 1 in FIG. 1B. Stud head 20 has a chamfered perimeter with a flat outer interface surface 38 that becomes flush with an outer surface of a plate when inserted in a properly countersunk hole. This allows for a seamless finish look of the surface of the fastened assembly.

Figure 3A:
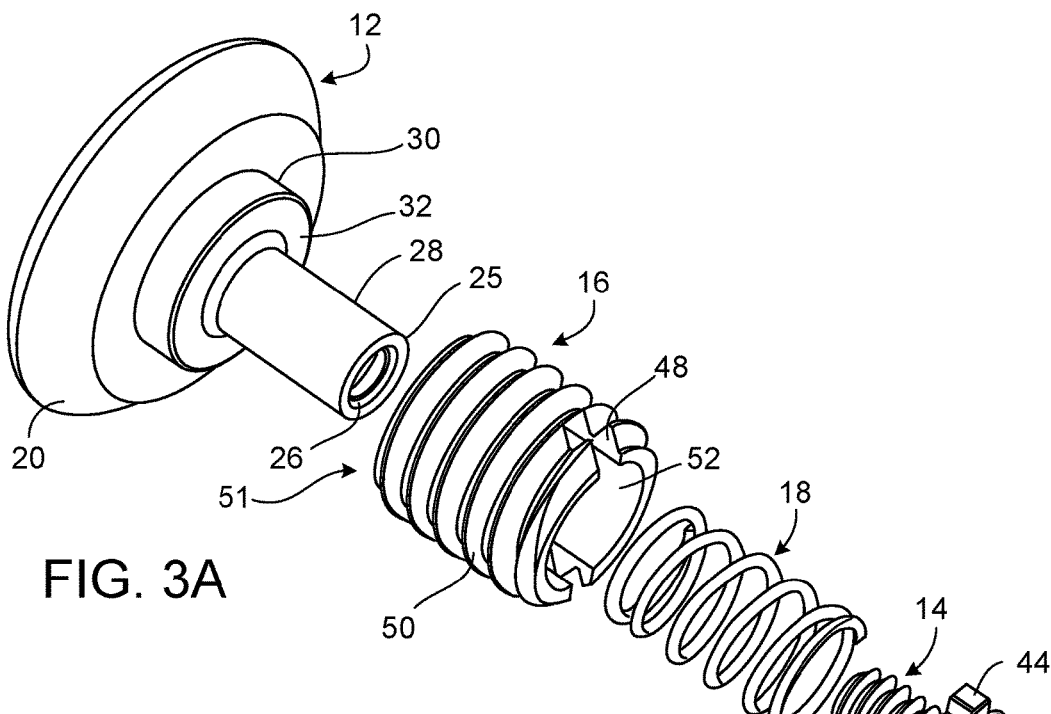
FIG. 3A is a perspective, exploded view of the threaded fastener.

Referring also to FIG. 3A, neck 30 of headed stud 12 includes a first bearing surface 32 configured to bear against threaded sleeve 16. Shank 28 includes a tapped hole 26 at a tip 25 of stud 12, opposite head 20. Tapped hole 26 is arranged to receive bolt 14. In this example, the length of sleeve 16 is the same as the length of shank 28 and bolt head 46 together. In other examples, shank 28 may be longer or shorter for different applications. Stud 12 is preferably made of carbon steel, but in different implementations, it can be made of aluminum, iron, bronze, stainless steel, or a different material, including a combination of these different alloys.

Figure 3B:
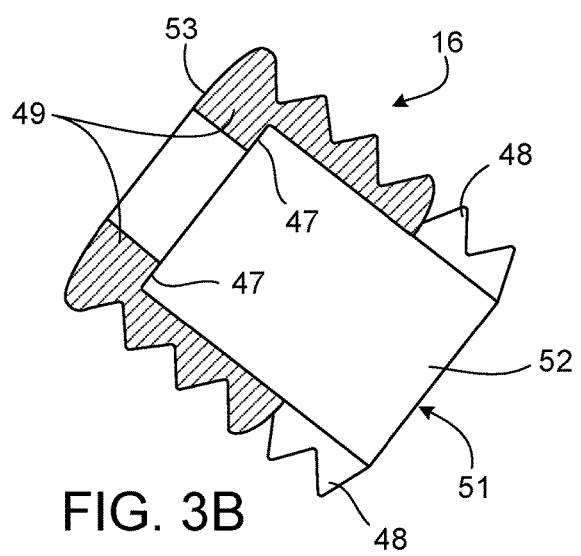
FIG. 3B is a perspective cross-section of a threaded sleeve.

Referring to FIGS. 3A and 3B, bolt 14 includes a bolt head 46 and a thread 40. Bolt head 46 features an interface surface 42 (e.g. a hexagonal socket surface) adapted to interface with a mating tool to impart torque on bolt 14. Alternatively, bolt head can have a different interface configuration for imparting torque to bolt 14, such as a full bearing surface, a flat head, a Philips head, or a square socket head. Bolt head 46 includes two ribs 44 projecting in opposite directions from a periphery of bolt head 46. Ribs 44 are configured to be received within corresponding slots 48 of threaded sleeve 16, as further discussed below with respect to FIG. 4. Threads 40 are configured for bolt 14 to be threaded into tapped hole 26 of stud 12, creating a flange at tip 25 of stud 12 when assembled. Alternatively, stud 12 and bolt 14 can be permanently coupled, such as with a press-fit coupling. The flange created by bolt head 46 bears against compression spring 18. More specifically, bolt head 46 has a second bearing surface 34 configured to bear against a second end of compression spring 18. Bolt 14 is preferably made of carbon steel, but in different implementations, it can be made of aluminum, iron, bronze, stainless steel, or a different material, including a combination of these different alloys.

Threaded sleeve 16 is in the form of a hollow cylinder 51 having an opening at each end. As shown in FIG. 3B, hollow cylinder 51 includes an internal shoulder 49 near one end and defines two slots 48 at the other end. Slots 48 are configured to receive ribs 44 of bolt 14 and to permit some longitudinal motion of the sleeve with respect to the bolt head when assembled. Shoulder 49 projects radially inwardly from an inner surface 52 of cylinder 51, and includes a shoulder bearing surface 47 arranged to bear against a first end of compression spring 18 (FIG. 3A). Inner surface 52 is flat while and outer surface is threaded 50. Sleeve 16 can be made of copper, zinc, steel, aluminum, or another material. The threads 50 about the outside of the sleeve are standard spiral threads, such as metric, unified, square, ACME, SAE, etc., suitable for the threaded hole in which the fastener is used.

Threaded sleeve 16 has an outer bearing surface 53 at the same end as shoulder 49. Bearing surface 53 is arranged to bear against first bearing surface 32 of stud 12 under preload from spring 18 (as in FIG. 1A). Referring to FIG. 3A, a major diameter of threaded sleeve 16 is the same as an outer diameter of neck 30 of stud 12. In some implementations, the size of the outer diameter and other dimensions of sleeve 16 may vary for different applications.

Compression spring 18 has an inner diameter slightly greater than a diameter of stud shank 28, allowing spring 18 to be disposed around shank 28 and be compressed and decompress freely about shank 28. Compression spring 18 has an outer diameter small enough to allow spring 18 to be freely compressed within threaded sleeve 16 as shown in FIG. 1A. Spring 18 has a first end that bears against shoulder bearing surface 47 (FIG. 3B) of threaded sleeve 16, and a second end that bears against second bearing surface 34 of bolt 14. In this example, spring 18 has closed and round ends to bear against bearing surfaces 47 and 34. Compression spring 18 can be any type of compression spring such as a coil spring, a Belleville spring, or a wave spring. In some examples, fastener 10 can have, instead of a compression spring, any compressible elastic component such as an elastomeric tube.

The number of coils and the spring constant of compression spring 18 can be selected according to the application of fastener 10. For most applications, the spring parameters will be selected such that the spring is partially compressed under fastening preload.

Figure 4:
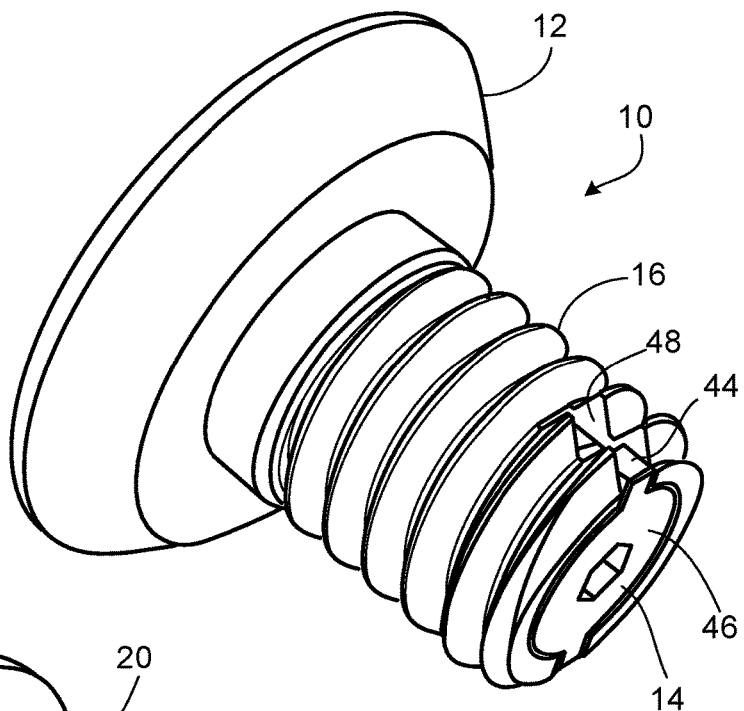
FIG. 4 is a perspective view of the threaded fastener.

Referring to FIG. 4, fastener 10 includes bolt head 46 with ribs 44 positioned within the slots 48 of threaded sleeve 16. Ribs 44 prevent threaded sleeve 16 from rotating with respect to bolt 14 and stud 12. This rotationally locked configuration allows threaded fastener 10 to be threaded into an assembly like a one-piece screw. Once the underside of the head of stud 12 bears against surrounding material, further rotation of the stud compresses the internal spring to generate a corresponding and controllable fastener preload. In addition, the sleeve 16 can be rotationally locked with other configurations of fastener 10. For example, the stud head can have ribs projecting from its neck and the sleeve can have slots extending from the end adjacent the stud head to receive the ribs of the stud head. In a further example, one of the heads can have a post that projects into a recess of the sleeve, for rotationally locking the sleeve. Conversely, sleeve 16 can have a projection (e.g., rib or post) extending from an end of the sleeve to be received by a slot or recess in a head of the fastener, for rotationally locking fastener 10.

Figure 5:
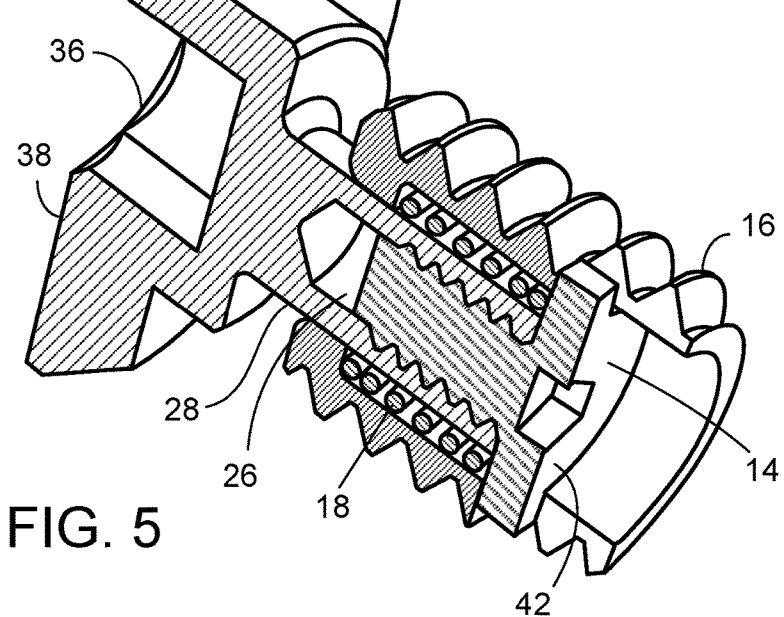
FIG. 5 is a perspective, cross-sectional view of the threaded fastener in an elongated position.

Referring also to FIG. 5, as the fastener is loaded axially by an external load beyond the fastener preload, sleeve 16 moves away from head 20, compressing spring 18. During extension and retraction of the fastener, spring 18 remains fully enclosed and shielded from the fastened components. Also, fastener 10 can be threaded into an assembly such that only interface surfaces 38 and 42 of fastener 10 are exposed, giving an assembly a seamless finish and an aesthetically pleasing appearance (as in FIG. 1B).

Fastener 10 is suitable for holding together assemblies that require temporary separation, such as assemblies that undergo vibrational motion, heat expansion, or shock loading. Fastener 10 is also useful for applications in which one or more fasteners cannot readily be accessed. In such applications, fastener 10 can be left secured in a threaded hole of one component while another slotted component is removed. Threaded fastener 10 can thus be used as one of multiple threaded fasteners holding two plates together under relatively low shear loads, allowing faster disconnection/reconnection and/or easy access for maintenance.

Figure 6A:
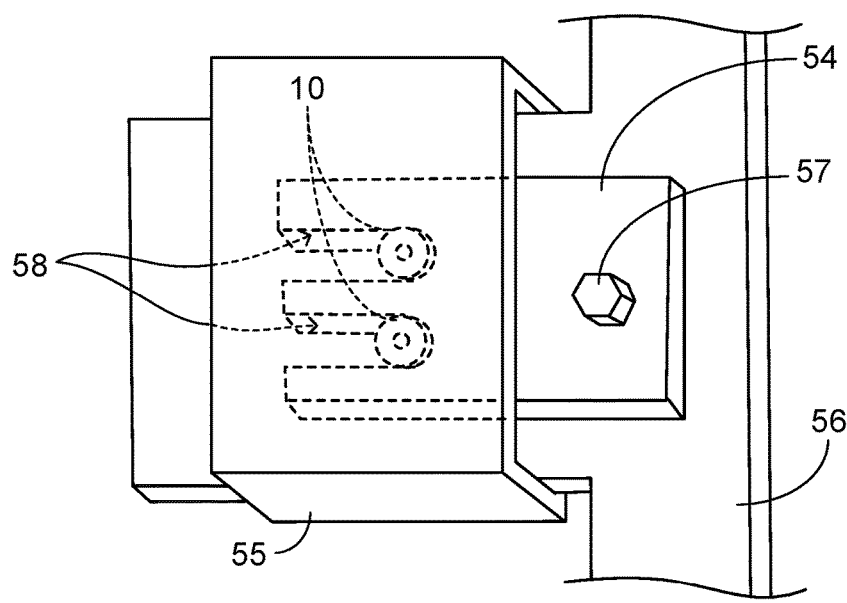
FIG. 6A is a perspective view of an assembly where two fasteners are not readily accessible.
Figure 6B:
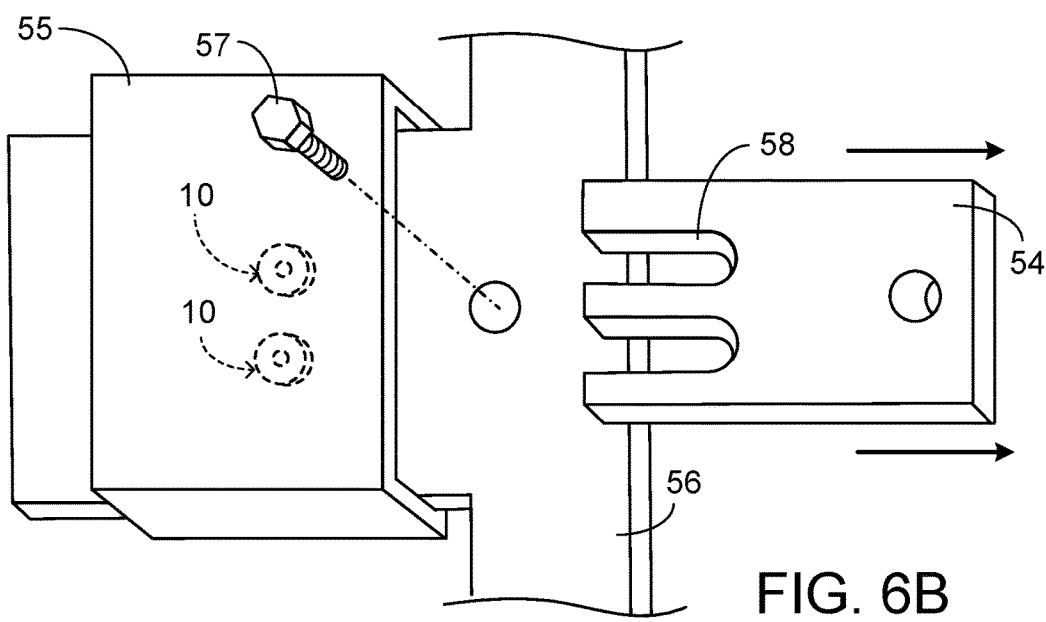
FIG. 6B is a perspective view of the assembly of FIG. 6A, disassembled.

Referring to the application of FIGS. 6A and 6B, two fasteners 10 hold an assembly together but are not readily accessible in the assembled application (FIG. 6A). The assembly includes a structure 56, a cover 55, and a removable plate 54 with open slots 58. Fasteners 10 hold plate 54 and structure 56 together, while allowing plate 54 to be removed without the need of accessing fasteners 10 to adjust their preload. In this example, the preload of fasteners 10 is set (by applying torque to fasteners 10) before mounting cover 55. The preload of fasteners 10 can be set such as to secure plate 54 in place while allowing plate 54 to be removed by sliding the plate away from fasteners 10 along a length of slots 58, as shown in FIG. 6B. To remove plate 54, first, a readily accessible bolt 57 holding plate 54 is removed. Then, plate 54 is removed by sliding the plate away from fasteners 10. In addition, plate 54 can be removed while a distal end of the plate (opposite fasteners 10) is separated from structure 56 (e.g., tilting the plate with respect to structure 56). In addition, plate 54 can be assembled back to its original position in a similar fashion, by first inserting plate 54 in conformity with fasteners 10, and then threading in bolt 57. The chamfered perimeter of stud head 20 (shown in FIG. 2A) has a slope that allows plate 54 to be inserted back, as an edge of slots 58 moves the head of the fastener away from structure 56. Plate 54 can be inserted parallel to structure 56 or at an angle (e.g., tilted with respect to structure 56). In some examples, plate 54 can be held in place with only fasteners 10 (e.g., without a bolt 57), allowing plate 54 to be quickly re-arranged to different positions by sliding plate 54.

Figure 7A:
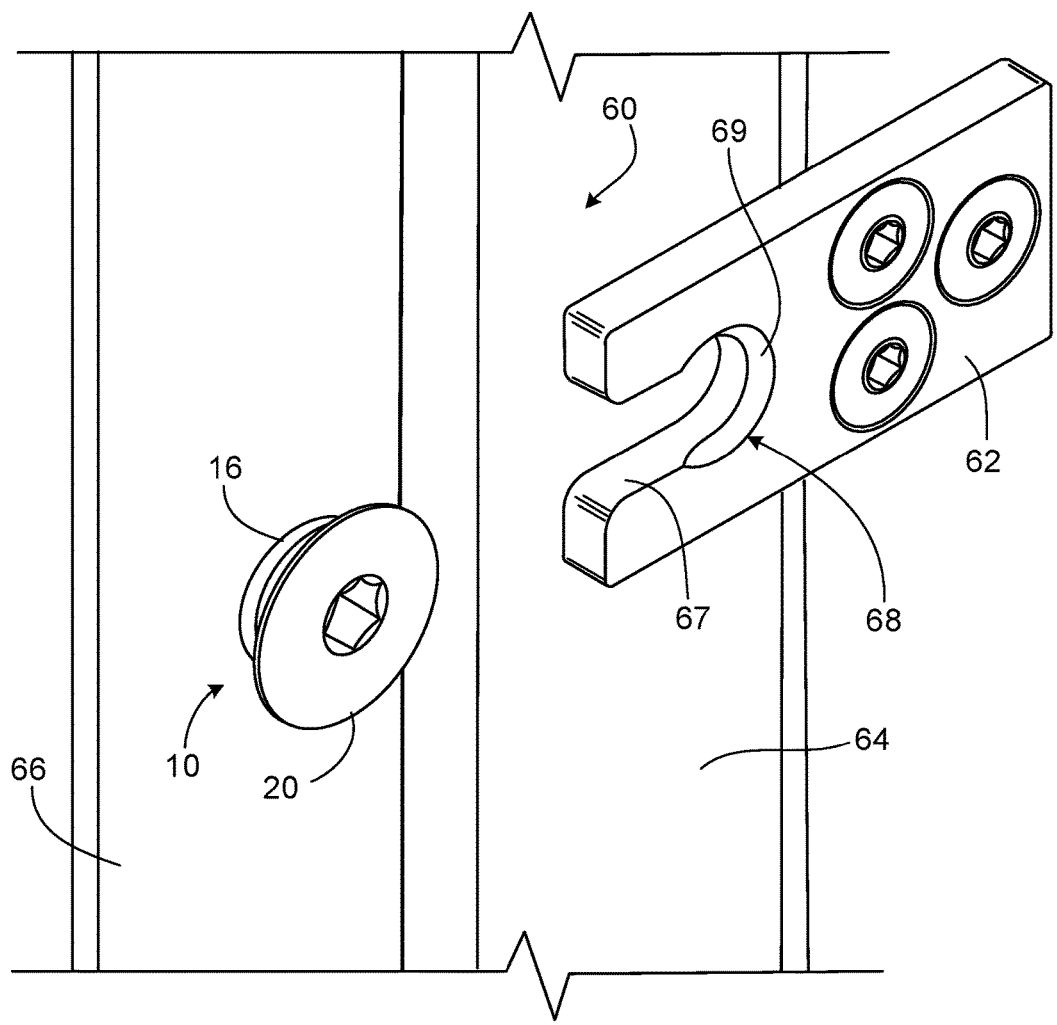
FIG. 7A is a perspective view of the threaded fastener used in a latching mechanism.
Figure 7B:
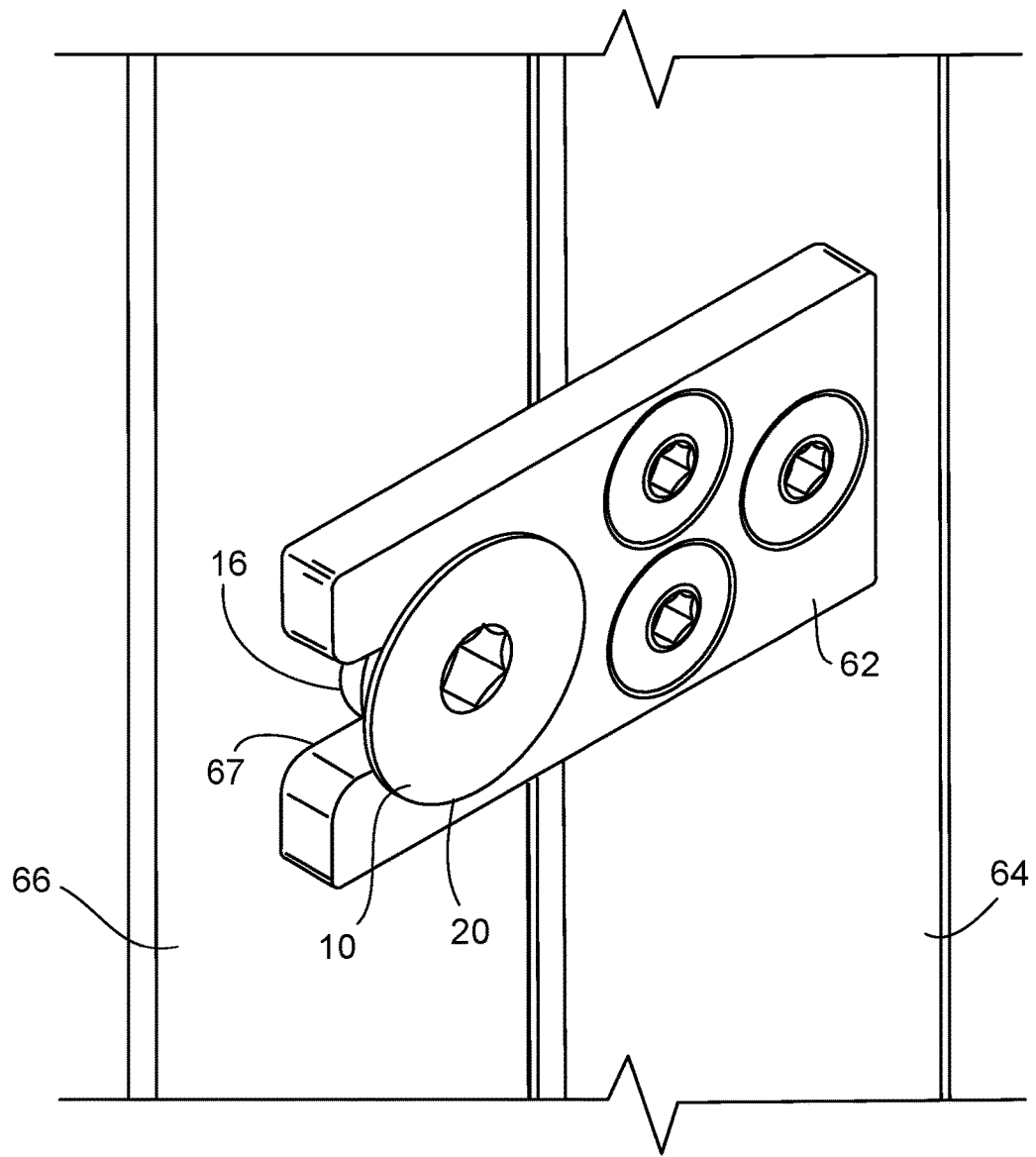
FIG. 7B is a perspective view of the latching mechanism of FIG. 7A, in an engaged position.

Another application of threaded fastener 10 is shown in FIGS. 7A and 7B, where a latching mechanism 60 is used to couple two pieces 64 and 66 together. A latch 62 has a keyhole slot 68 with a narrow portion 67 and a wider, circular portion 69. As latch 62 slides in to latch with fastener 10, narrow portion 67 causes stud head 20 to separate from threaded sleeve 16. The chamfered configuration of head 20 (FIG. 2A) helps narrow portion 67 to slide in, separating head 20 from sleeve 16. As head 20 separates from sleeve 16, the internal spring of fastener 10 compresses, increasing the preload of fastener 10. Further inserting latch 62 positions head 20 within circular portion 69 (in a fully engaged position), causing head 20 to slightly move toward sleeve 16, as shown in FIG. 7B. This position secures the assembly in place. This particular application of fastener 10 can be useful in door latches or in applications where parts of an assembly need to be quickly assembled and disassembled.

Figure 8A:
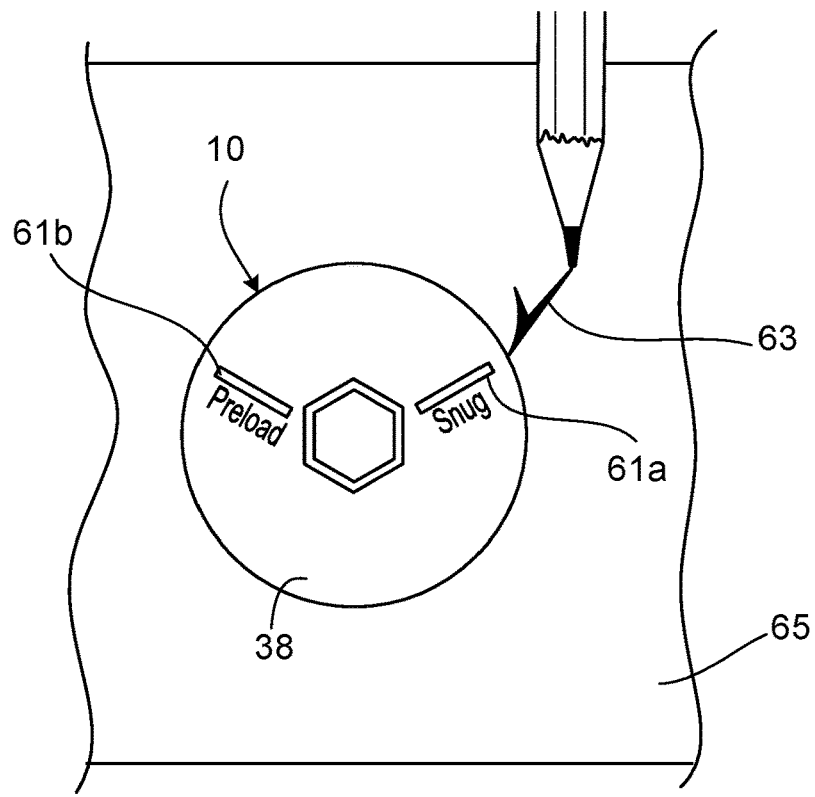
FIG. 8A shows a threaded fastener installed but prior to preload.
Figure 8B:
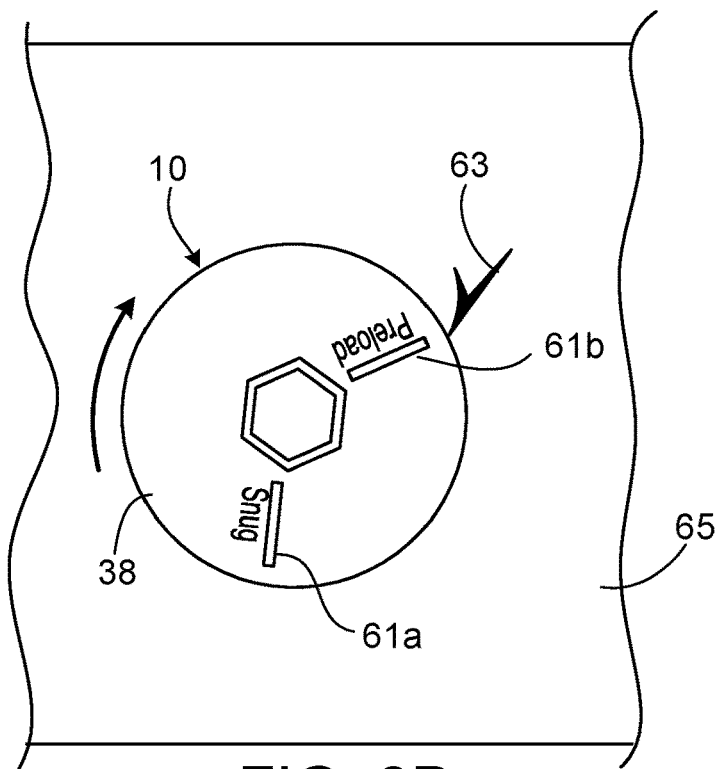
FIG. 8B shows the threaded fastener of FIG. 8A after preload.

Referring to FIGS. 8A and 8B, fastener 10 is used to set a preload at a design point for fastener assembly 10. Fastener 10 has a 'snug tight' mark 61a and a 'preload' mark 61b. The term 'snug tight' is used herein to describe a condition in which the components in a connection have come into an initial firm contact (e.g., hand-tightened). Preload mark 61b is used to set the preload at the design point for fastener 10 after the fastener has been tightened to snug. First, as shown in FIG. 8A, fastener 10 is threaded clockwise into a hole of a surface 65 and tightened to snug. Then, a mark 63 is made on adjacent surface 65 aligned with snug tight mark 61a. After marking surface 65, the preload is set at the design point of fastener 10 by applying torque to fastener 10 in a clockwise direction to align preload mark 61b with mark 63, as shown in FIG. 8B. The fastener preload can be set based on spring characteristics. By using fastener 10 in this application, a user can set fastener 10 at a desired preload without the need of using a torque measuring device (e.g., torque wrench, torque meter, etc.) In some implementations, fastener 10 can be used to measure clamp force, tensile force, or other related measurements.

Figure 9A:
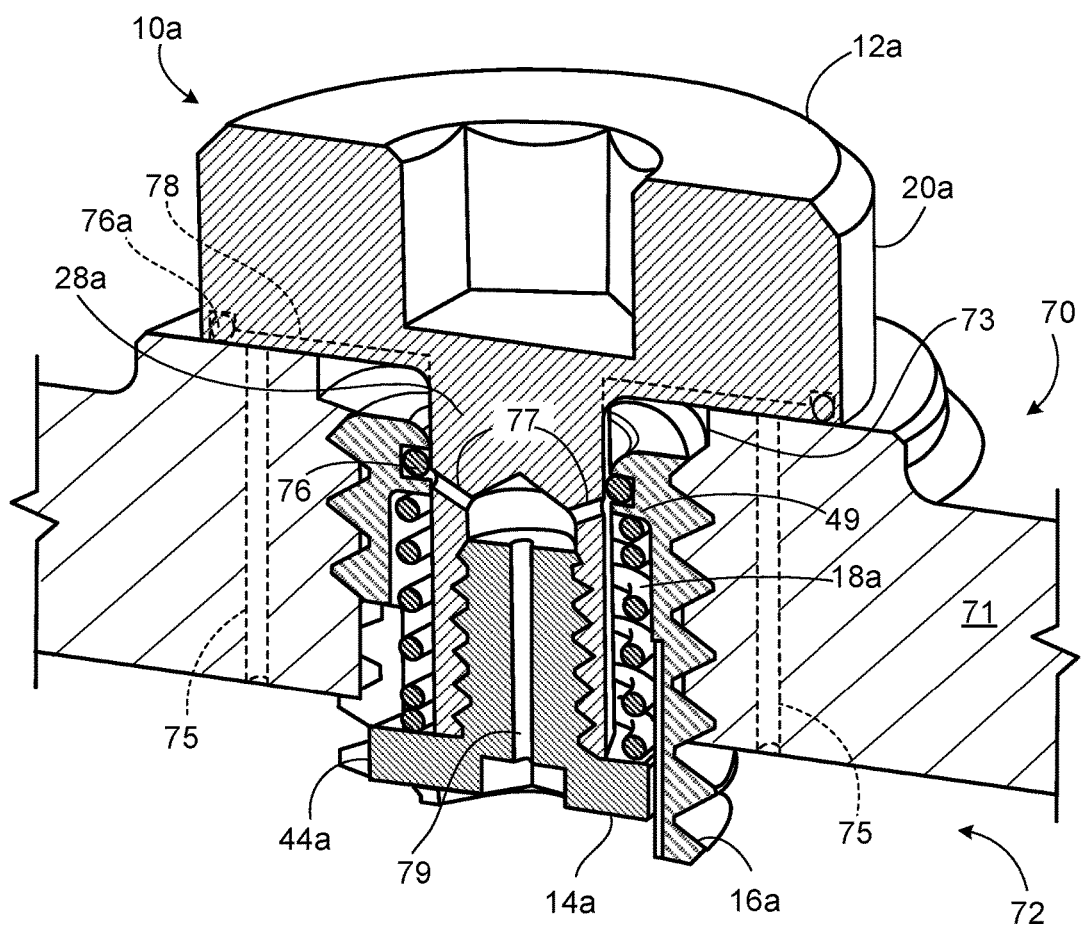
FIG. 9A is a perspective, cross-sectional view of a threaded fastener used as a pressure relief valve in a pressurized container, in a closed position.
Figure 9B:
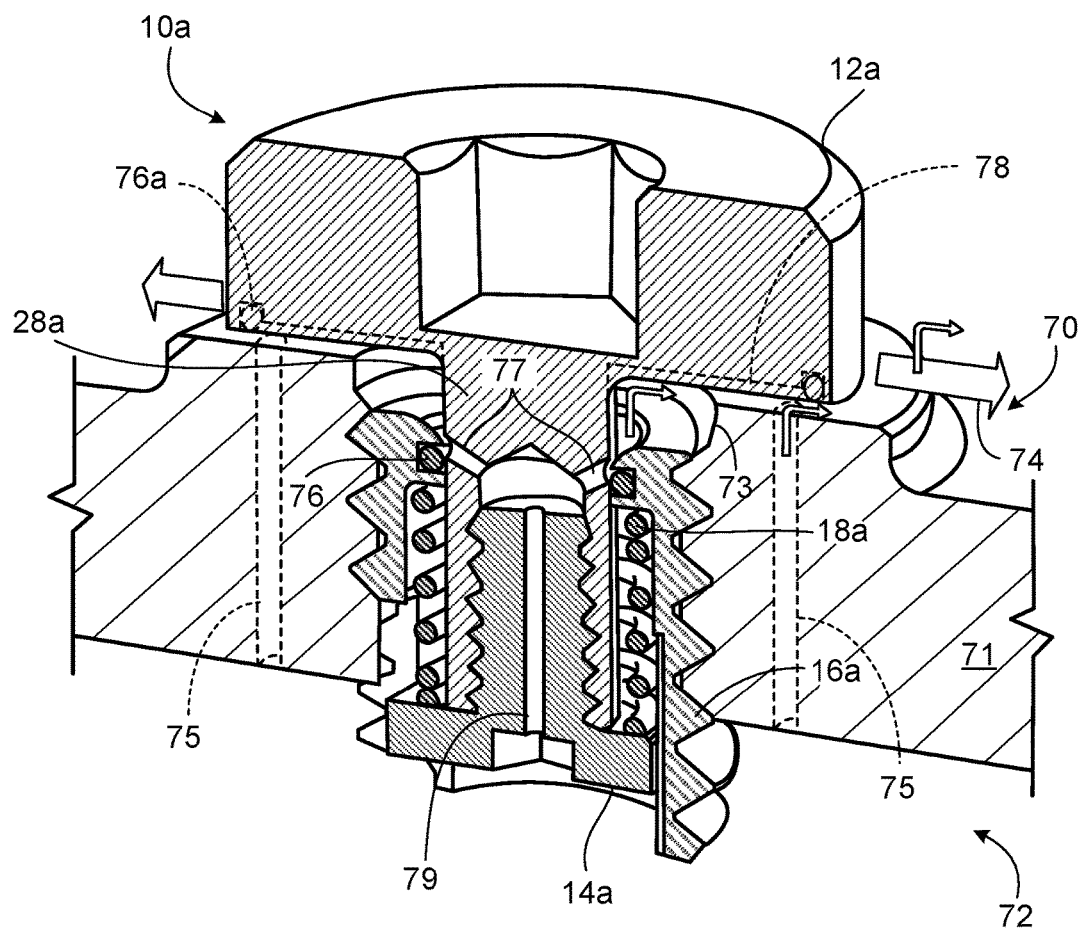
FIG. 9B is a perspective, cross-sectional view of the threaded fastener of FIG. 9A in an opened position.
Figure 9C:
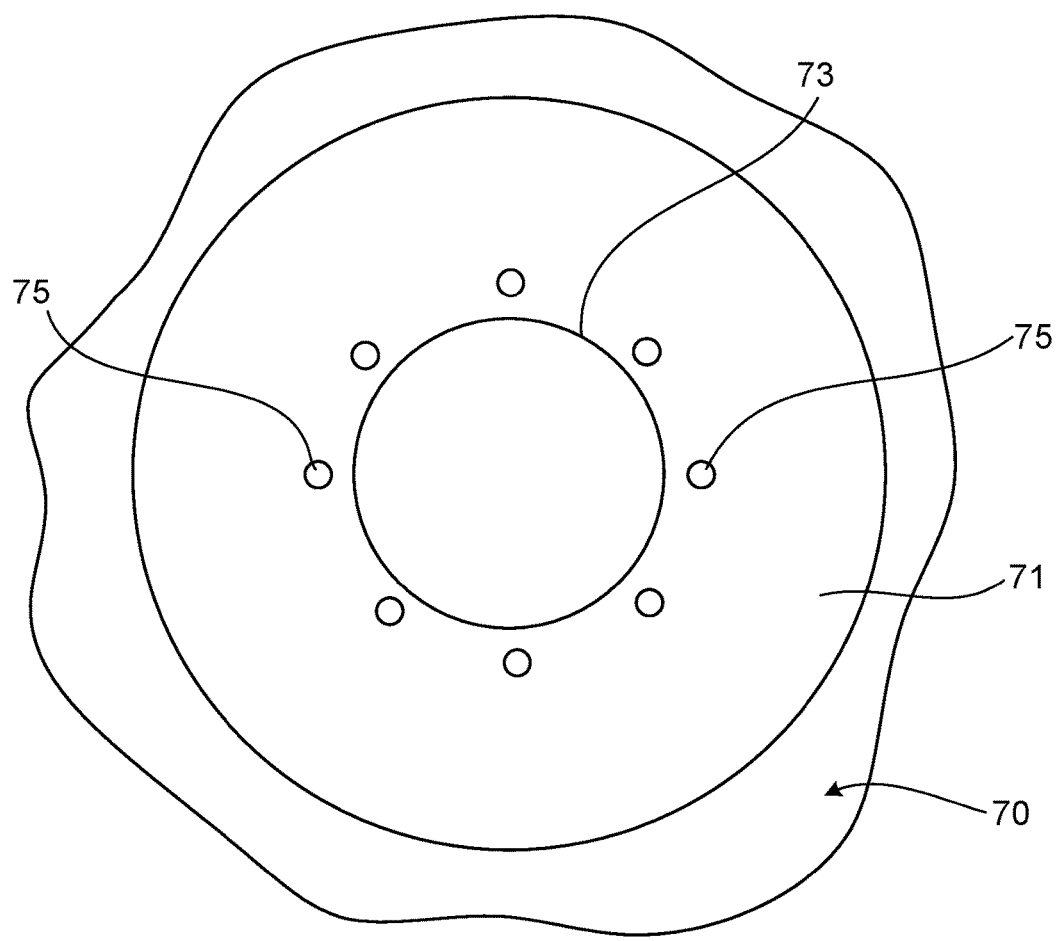
FIG. 9C is a top view of a section of the pressurized container of FIG. 9A, without the threaded fastener.

FIGS. 9A and 9B show fastener assembly 10a used as a direct-acting pressure relief or pressure-limiting valve. In this example, fastener 10a is threaded into a hole 73 through a wall 71 of a pressurized container 70. In FIG. 9A, fastener 10a is held in a closed position by a direct force of spring 18a, with the spring force opposed by hydraulic pressure in an interior 72 of the container. Fastener 10a includes an O-ring 76 that stops fluid from exiting container 70. This configuration allows fastener 10a to act as a valve having a cracking pressure and a full-relief valve pressure. The cracking pressure is a hydraulic pressure of the container that exceeds the preload force of the spring. When the preload is exceeded, stud 12a begins to move upward by force of the pressure acting on the diameter of the shank 28a (e.g., equivalent to the inner diameter of the O-ring 76). This cracking pressure can be adjusted by the preload of the spring, such as by how far the spring is initially compressed by torque applied to the fastener head. At full relief pressure, the stud has moved, further compressing the spring, until relief ports 77 through the wall of shank 28a are exposed to the environment beyond the O-ring, as shown in FIG. 9B, allowing flow 74 from the container along a flow path along a hole 79 through bolt 14a, ports 77, between the sleeve and the shank, and under head 20a. The full relief pressure can be adjusted by spring characteristics. While FIGS. 9A and 9B show the fastener assembly used only as a pressure valve, such a fastener assembly can similarly be employed to act as a relief valve while simultaneously fastening another component to the pressure vessel, such as by securing something under the head of the fastener assembly. In such an application, other, standard fasteners may also be used to secure the components firmly together under high pressure conditions. In another configuration, an O-ring 76a is placed in a recess 78 in the underside of stud head 20a, outboard of pressure relief passages 75, such that the container pressure effectively acts on an area enclosed by O-ring 76a. In this example, flow 74 exits the container along a flow path along hole 75 through wall 71, and along the underside of head 20a.

Figure 10:
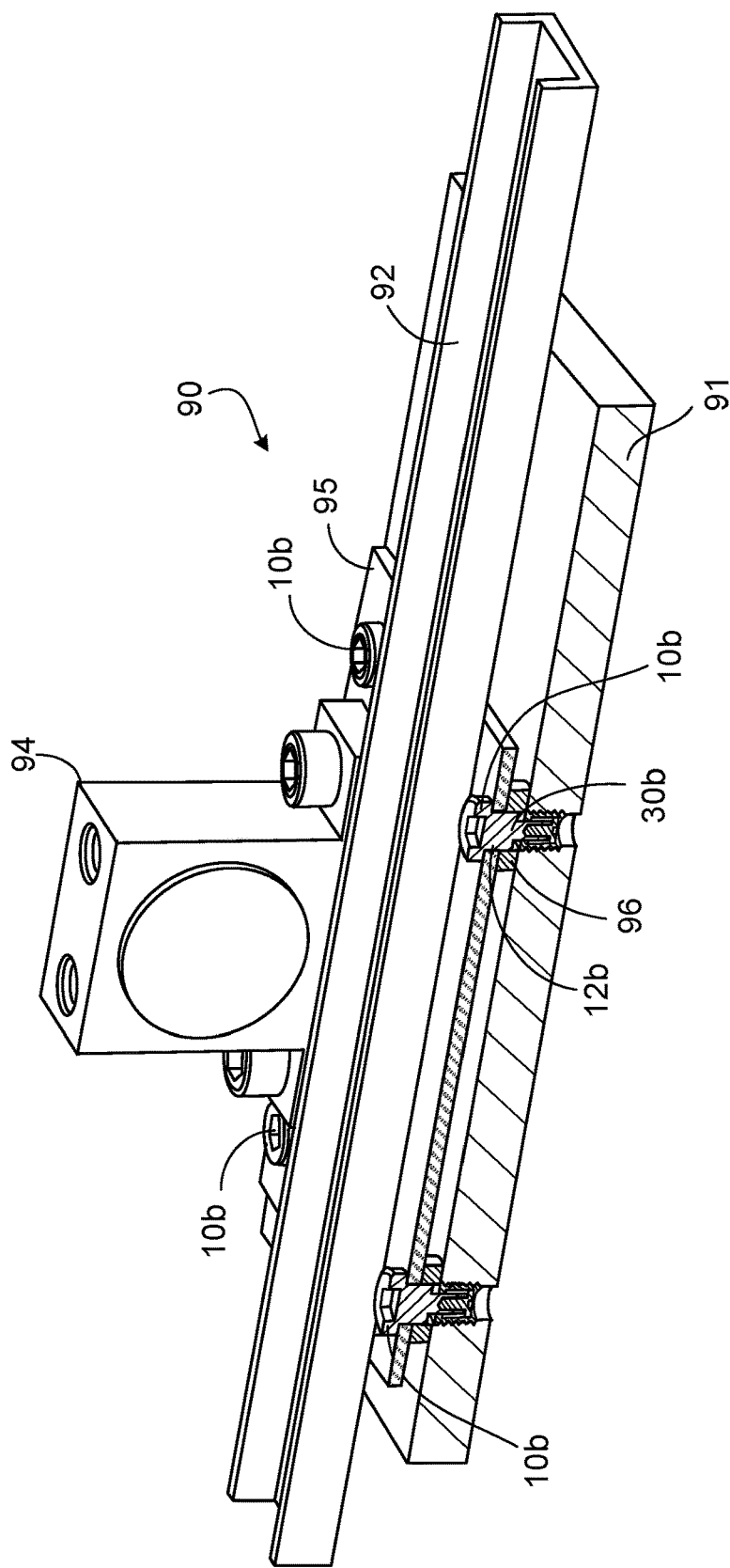
FIG. 10 illustrates threaded fasteners used in a feed channel with a vibration generator.

FIG. 10 shows fasteners 10b used as vibration isolation fasteners in a feed channel mechanism 90. In this example, fastener 10b includes an elongated neck 30b of sufficient length to allow a compliant washer 96 to fit between the elements coupled by fastener 10b. A vibration generator 94 is coupled to a feed channel 92 for transmitting vibrational motion to feed channel 92. This system can be a part of a manufacturing process used for testing, separating, breaking apart, or otherwise processing a product passing through feed channel 92. Fasteners 10b are threaded into a mechanism base 91, fastening a vibration generator base 95 to mechanism base 91. The vibration of generator base 95 causes studs 12b to vibrate, transmitting the motion to the internal compression spring, allowing fasteners 10b to act as a damper. Fasteners 10b, in cooperation with compliant washers 96, help isolate base 91 from the vibrational motion of generator 94.

Figure 11:
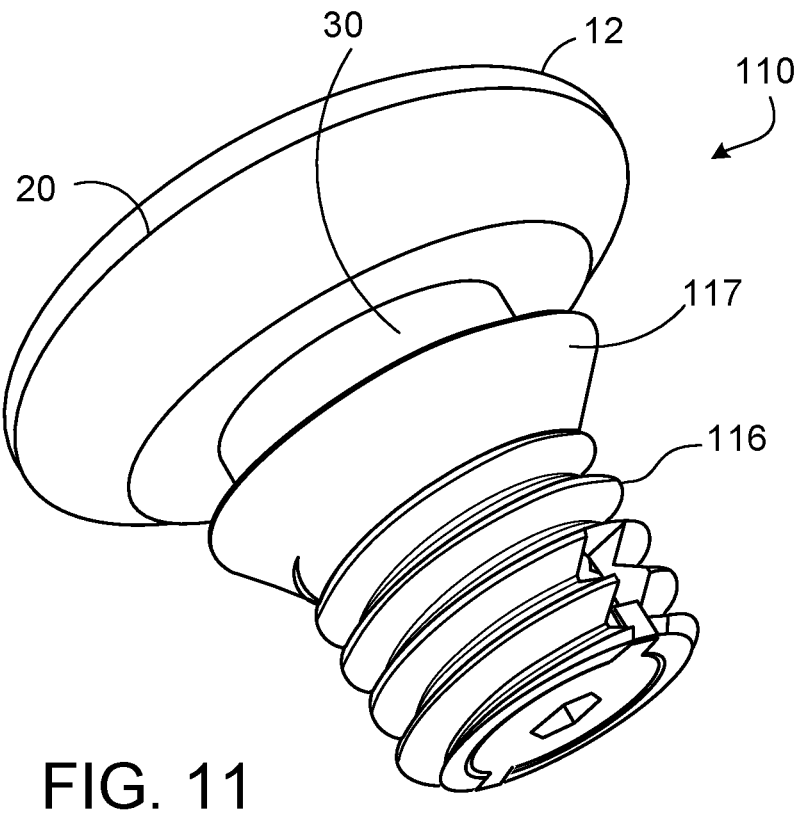
FIG. 11 is a perspective view of a threaded fastener with a tapered sleeve head.

Referring now to FIG. 11, fastener 110 has a different configuration of a threaded sleeve, but is otherwise identical to the example of FIG. 4. Threaded sleeve 116 has a tapered outer head surface 117 for controlling the screw depth of fastener 110. The upper end of sleeve 116 bears against neck 30 of stud 12. As in the example of FIGS. 4-5, ribs disposed within slots of the sleeve transfer torque from the stud to the sleeve to turn the fastener into a threaded hole until tapered surface 117 of the sleeve engages a tapered entrance to the hole and constrains sleeve 116 from moving further into the threaded hole, leaving a gap underneath the head of stud 12. This configuration of threaded fastener 110 has a set preload that is not adjustable. Fastener 110 can be used in applications where a set preload is required, such as release valves, or assemblies with specific clamp-force requirements.

Figure 12:
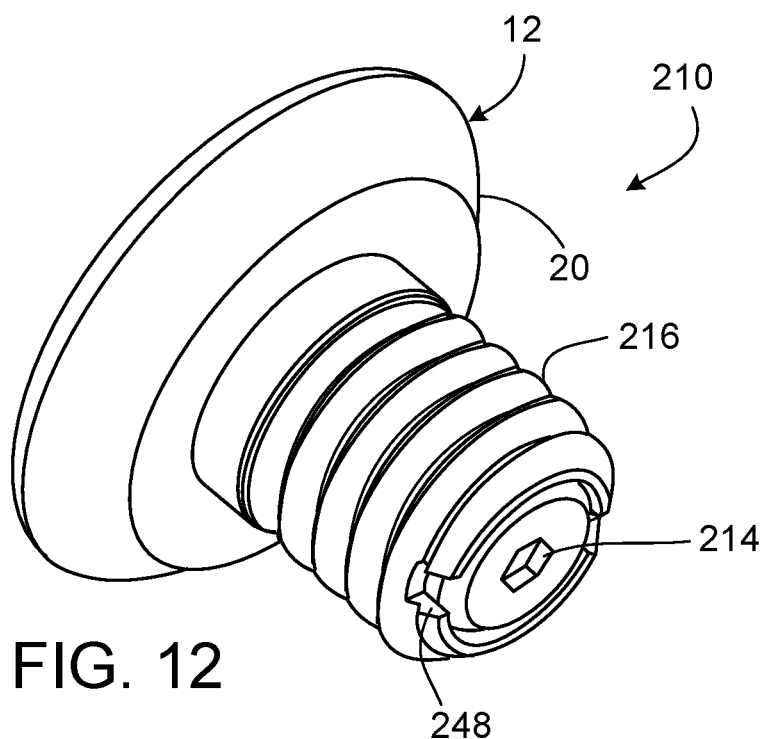
FIG. 12 is a perspective view of a threaded fastener that is not rotationally locked.

Referring to FIG. 12, threaded fastener 210 is similar to the fastener of FIG. 4 but without a rotational lock between the stud and the sleeve. Threaded fastener 210 can be threaded into a through hole, and preloaded by engaging the distal end of threaded sleeve 216 with a mating tool. Unlike the bolt of the fastener of FIG. 3A, bolt 214 does not include ribs, allowing sleeve 216 to rotate with respect to stud 12 and bolt 214. Sleeve 216 includes slots 248 for interfacing with a mating tool to impart torque on sleeve 216. This configuration of fastener 210 can be used, for example, in applications where slots 248 of fastener 210 are more accessible in a final assembly than head 20 of fastener 210.

While a number of examples have been described for illustration purposes, the foregoing description is not intended to limit the scope of the invention, which is defined by the scope of the appended claims. There are and will be other examples and modifications within the scope of the following claims.

What is claimed is:

1. A fastener assembly comprising:
   a stud comprising an elongated shaft, a first head at one end of the shaft and a second head at an opposite end of the shaft, a bearing surface of the first head opposing a bearing surface of the second head;
   a threaded sleeve disposed about the elongated shaft of the stud and comprising an exterior surface adapted for connecting to a threaded hole, and having an interior surface with an inwardly projected shoulder, the threaded sleeve having an outer diameter smaller than an outer diameter of the first head of the stud; and
   a spring disposed about the shaft of the stud and at least partially inside the sleeve, the spring having a first end bearing against the shoulder of the threaded sleeve and having a second end bearing against the bearing surface of the second head of the stud, the spring arranged to press the sleeve against the bearing surface of the first head;
   such that moving the sleeve away from the first head of the stud causes the spring to compress.

2. The fastener assembly of claim 1, wherein at least one of the first and second heads is adapted to interface with a mating tool to impart torque on the fastener assembly.

3. The fastener assembly of claim 1, wherein the sleeve is adapted to interface with a mating tool to impart torque on the fastener assembly.

4. The fastener assembly of claim 1, wherein the spring comprises a compression spring.

5. The fastener assembly of claim 1, wherein one of the first and second heads comprises at least one rib projected from a periphery of the head.

6. The fastener assembly of claim 5, wherein the threaded sleeve comprises at least one slot configured to receive the rib, for rotationally locking the threaded sleeve.

7. The fastener assembly of claim 6, further comprising a depth stopper that limits displacement of the sleeve away from the first head of the stud when applying torque to the fastener assembly.

8. The fastener assembly of claim 1, wherein both the first and second heads are permanently secured to the shaft.

9. The fastener assembly of claim 1, wherein the shaft is permanently connected to the first head, and wherein the second head is adjustably coupled to the shaft, for adjusting a preload of the spring.

10. The fastener assembly of claim 1, wherein the second head comprises at least one rib projecting laterally into a slot of the threaded sleeve.

11. The fastener assembly of claim 1, wherein the threaded sleeve defines slots facing away from the first head, the slots adapted to interface with a mating tool to impart torque on the threaded sleeve, for adjusting a preload of the spring.

12. The fastener assembly of claim 1, further comprising marks on an outer surface of the first head and indicating a design preload rotation.

13. The fastener assembly of claim 1, further comprising a seal that opens when the sleeve is moved away from the first head.

14. The fastener assembly of claim 13, wherein the seal comprises an O-ring positioned to seal between an underside of the first head and an adjacent surface with the fastener assembly installed.

15. A method of releasably connecting two components, the method comprising:
   threading the fastener assembly of claim 1 into a threaded hole defined in a first of the two components; and
   compressing a second of the two components between the first component and an underside of the first head of the stud of the fastener assembly, thereby distending the fastener assembly and compressing the fastener assembly spring to maintain a preload tension in the stud shaft of the fastener assembly.

16. The method of claim 15, wherein the second component is compressed as the fastener assembly is threaded into the hole.

17. The method of claim 15, wherein the fastener assembly is first threaded into the hole, and then the second component is slid under the first head of the fastener assembly.

18. The method of claim 15, wherein the threaded hole is a through hole and wherein threading the fastener assembly comprises engaging a distal end of the sleeve of the fastener assembly with a tool from a side of the first component opposite the first head of the fastener assembly.

19. The method of claim 15, wherein compressing the second component comprises rotating the stud of the fastener assembly through a predetermined rotation angle to develop the desired preload.

20. The method of claim 19, wherein the first head of the fastener assembly comprises a visible mark indicating the predetermined rotation angle.

21. The method of claim 20, further comprising, after threading the fastener assembly and before compressing the second component, marking a surface of the second component with a surface mark aligned with a first feature of the fastener assembly, and wherein compressing the second component comprises rotating the first head of the fastener assembly to align the surface mark with the mark indicating the predetermined rotation angle.

22. A method of limiting pressure in a volume, the method comprising threading the fastener assembly of claim 1 into a threaded hole defined through a wall at least partially enclosing the volume, such that the threaded fastener assembly seals the threaded hole; and
   leaving an entrance to an exit flow path associated with the fastener assembly exposed to the volume, such that the volume pressure works against the spring to cause the first head of the stud to move away from the sleeve to open the exit flow path from the entrance to an environment about the first head of the fastener assembly in response to the volume pressure exceeding a predetermined limit.

23. A fastener assembly comprising:
   a stud comprising an elongated shaft, a first head at one end of the shaft and a second head at an opposite end of the shaft, a bearing surface of the first head opposing a bearing surface of the second head;
   a threaded sleeve disposed about the elongated shaft of the stud and comprising an exterior surface adapted for connecting to a threaded hole, and having an interior surface with an inwardly projected shoulder; and
   a spring disposed about the shaft of the stud and at least partially inside the sleeve, the spring having a first end bearing against the shoulder of the threaded sleeve and having a second end bearing against the bearing surface of the second head of the stud, the spring arranged to press the sleeve against the bearing surface of the first head;
   such that moving the sleeve away from the first head of the stud causes the spring to compress;
   wherein the second head comprises at least one rib projecting laterally into a slot of the threaded sleeve.

24. A fastener assembly comprising:
- a stud comprising an elongated shaft, a first head at one end of the shaft and a second head at an opposite end of the shaft, a bearing surface of the first head opposing a bearing surface of the second head;
- a threaded sleeve disposed about the elongated shaft of the stud and comprising an exterior surface adapted for connecting to a threaded hole, and having an interior surface with an inwardly projected shoulder; and
- a spring disposed about the shaft of the stud and at least partially inside the sleeve, the spring having a first end bearing against the shoulder of the threaded sleeve and having a second end bearing against the bearing surface of the second head of the stud, the spring arranged to press the sleeve against the bearing surface of the first head;
- such that moving the sleeve away from the first head of the stud causes the spring to compress;
- wherein the threaded sleeve defines slots facing away from the first head, the slots adapted to interface with a mating tool to impart torque on the threaded sleeve, for adjusting a preload of the spring.

* * * * *